United States Patent [19]

Davies et al.

[11] 4,292,537
[45] Sep. 29, 1981

[54] SYSTEM FOR TESTING OPTICAL FIBERS

[75] Inventors: Terence J. Davies; Larry A. Franks; Melvin A. Nelson, all of Santa Barbara, Calif.

[73] Assignee: The United States of America as represented by the United States Department of Energy, Washington, D.C.

[21] Appl. No.: 181,511

[22] Filed: Aug. 26, 1980

Related U.S. Application Data

[63] Continuation of Ser. No. 868,636, Jan. 11, 1978, abandoned.

[51] Int. Cl.³ .............................................. G01T 1/20
[52] U.S. Cl. .............................................. 250/361 R
[58] Field of Search ............... 250/361 R, 362, 368, 250/393, 395, 227; 356/432, 433, 434

[56] References Cited

U.S. PATENT DOCUMENTS 3,619,624  11/1971  Sorenson ..................... 356/201 X

OTHER PUBLICATIONS

A Technique for Measuring Optical Fiber Transmission Using the Time Dispersion of Cerenkov Radiation, Franks et al., Journal of Applied Physics, vol. 48, No. 9, Sep. 1977, pp. 3639-3641.

Primary Examiner—Davis L. Willis
Attorney, Agent, or Firm—John A. Koch; Dean Carlson; James E. Denny

[57] ABSTRACT

A system for nondestructively determining the attenuation coefficient, $\alpha(\lambda)$, of low-loss optical fiber wave guides. Cerenkov light pulses are generated at a plurality of locations in the fiber by a beam of charged particles. The transit times of selected spectral components and their intensities are utilized to unfold the $\alpha(\lambda)$ values over the measured spectrum.

7 Claims, 5 Drawing Figures

SYSTEM FOR TESTING OPTICAL FIBERS

The invention described herein was made in the course of or under Contract EY-76-C-08-1183 with the U.S. Department of Energy.

This is a continuation, of application Ser. No. 868,636, filed Jan. 11, 1978 now abandoned.

BACKGROUND OF THE INVENTION

This invention relates to low-loss optical fiber wave guides and more particularly to a system for nondestructively determining the optical transmission characteristics of such optical wave guides.

The use of low-loss fiber optic wave guides to transmit intelligence utilizing light as the carrier is now well known. The number of particular systems, methods, arrangements, schemes, etc., for utilizing the transmission of light through fiber optic wave guides for the transmission of intelligence is, indeed, very great.

In many of these particular applications of fiber optic wave guides, it is necessary that the transmission characteristics of the wave guide be known. It has been found that the transmission and dispersion characteristics vary quite greatly among wave guides from different manufacturers and even among the wave guides supplied by a single manufacturer. The composition of the glass and impurities and inhomogeneities therein appear to be the main factors affecting these characteristics. Moreover, it is usual that a manufacturer will supply transmission data for its wave guides at a single wavelength of light. That data is of limited practical value if the wave guide is to be used to transmit at a different wavelength since the optical attenuation coefficient, $\alpha(\lambda)$, is strongly dependent upon the wavelength of the light transmitted. In a typical low-loss fiber, $\alpha(\lambda)$ can range from 4 dB/km at 800 nm to over 100 dB/km at 400 nm.

One example of an application where this is of critical importance is in connection with the underground testing of nuclear explosives. It is common practice in such testing to emplace the explosive to be tested at the bottom of a hole drilled into the earth in order that the radioactive materials produced by the explosion be contained within the earth. Radiation produced upon detonation of the nuclear explosion, such as neutrons or gamma rays, is utilized to provide information on the performance of the nuclear device. A fluor is placed in the path of the radiation and the light produced by the action of the radiation on the fluor is transmitted from the underground detonation site uphole to the earth's surface through fiber optic wave guides. A knowledge of the transmission characteristics of the light guide at the wavelengths emitted by the fluor is, of course, essential to the unfolding of intelligence on the radiation seen by the fluor.

A common technique for measuring $\alpha(\lambda)$ of fiber optic wave guides utilizes a high-intensity arc lamp in conjunction with an external wavelength dispersion device, such as a monochromator or interference filter, and a photoelectric detector. In practice, the attenuation is measured in two different lengths of fiber and the difference is used to obtain the attenuation per unit length of the fiber. It will be appreciated that this procedure necessitates a breaking of the fiber to get the two lengths thereof.

SUMMARY OF THE INVENTION

Accordingly, it is an object of the invention to provide a system for providing a nondestructive determination of the attenuation coefficient for fiber optic wave guides over a broad spectral region on a continuous range of fiber lengths.

Briefly summarized, the above and additional objects are accomplished by a technique which utilizes the generation of identical Cerenkov light pulses at several points along the length of the fiber in a manner whereby the Cerenkov light pulses generated at the several points are transmitted down the fiber, detected at the end of the fiber by suitable optical detection means, and utilized to determine the transmission characteristics per unit length of the fiber.

The manner in which Cerenkov light may be generated in fiber optic wave guides is described in U.S. Pat. No. 3,984,332, issued Oct. 5, 1976, to Melvin A. Nelson, Terence J. Davies, and John R. Morton, assignors to the assignee of the instant application. That patent, which is entitled "Radiation Detection System," is incorporated herein by reference. To briefly summarize therefrom, when a charged particle moves through the glass fibers at a velocity which exceeds the speed of light in the glass, light is emitted in a cone surrounding the charged particle trajectory. The cone of emitted light is at an angle, $\theta$, to the particle trajectory where $$\cos \theta = \frac{1}{n(v/c)} \qquad (1)$$

where n is the refractive index of the glass, v is the velocity of the charged particles, and c is the speed of light. Therefore, a significant quantity of Cerenkov light can be made to travel down the fiber by orienting the fiber to the charged particle trajectory within the Cerenkov angle $\theta$, plus or minus the acceptance angle, $\phi$, of the fiber.

Accordingly, the optical fiber for which the attenuation coefficient is to be determined is positioned with respect to a charged particle beam so that the beam is intercepted by the fiber at two or more points at appropriate angles whereby identical Cerenkov pulses are generated within and transmitted down the fiber. The fiber length between these pulse initiation (or launch) points defines the differential transmission length $\Delta L$. The transmitted Cerenkov pulses are detected at the end of the fiber by a photo detecting means, such as a wide-band photomultiplier tube (PMT), and recorded such as by a sampling oscilloscope and data acquisition system.

The time domain distributions of the transmitted pulses are transformed to the wavelength domain by measuring the relationship between the arrival times of the various spectral components. This is done by remotely inserting calibrated narrow-band filters between the end of the fiber and the photo detecting means and recording the resultant distributions in the same manner as in the unfiltered case. When a predetermined number of these spectral markers has been recorded, a composite display of the filtered and unfiltered data is recalled and the time arrival between markers is determined. After transformation to the wavelength domain, the transformed amplitudes and the known differential transmission lengths are used to calculate $\alpha(\lambda)$ from the defining equation:

$$\alpha(\lambda) = \frac{10}{\Delta L} \log_{10} \frac{I_1(\lambda)}{I_2(\lambda)} \quad (2)$$

where $I_1(\lambda)$ is the intensity at wavelength $\lambda$ of the pulse transmitted through the shorter of two fiber lengths $L_1$ and $I_2(\lambda)$ is the intensity of the pulse transmitted through the longer of the two fiber lengths $L_2$ and $\Delta L = L_2 - L_1$.

The above-mentioned and additional objects, advantages, and applications of the invention and a further understanding of the invention will be apparent after consideration of the following detailed description of the best mode contemplated for carrying out the invention described in conjunction with the accompanying drawing.

DETAILED DESCRIPTION

Figure 1:
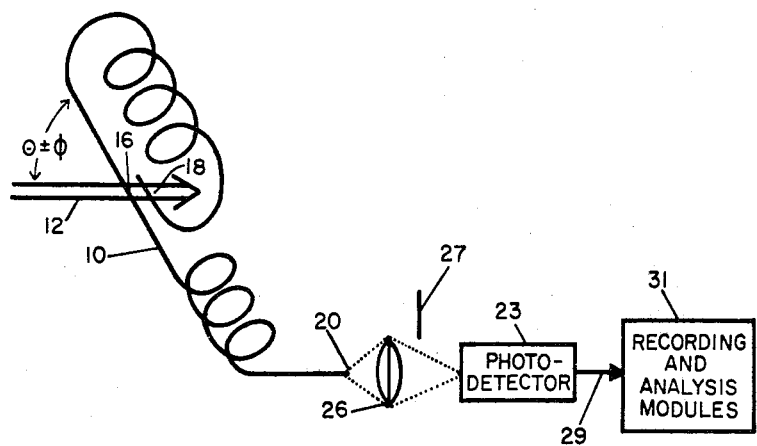
FIG. 1 is a schematic representation of a system for determining the optical transmission and dispersion characteristics of a fiber optic wave guide in accordance with the invention, FIG. 2 provides graphical representations of information obtained by the system of FIG. 1.

Referring now to FIG. 1, the fiber optic wave guide 10 for which the optical transmission and dispersion characteristics are to be determined is positioned with respect to beam of charged particles 12 such that the beam intersects the fiber at two or more points, such as 16 and 18. Beam 12 intersects the fiber at points 16 and 18 at angles such that Cerenkov light is generated at these points and transmitted down the fiber to end 20. As explained above, and more fully in the above-referenced patent to Nelson, Davies, and Morton, Cerenkov light is generated in and transmitted through the optical fiber when the beam of charged particles intersects the fiber at the Cerenkov angle, $\theta$, plus or minus the acceptance angle, $\phi$, of the fiber.

The Cerenkov light transmitted to end 20 of the fiber is detected by photodetector 23 after appropriate conditioning, if necessary or desired, by appropriate means, such as by focusing lens 66. The function of filter 27 in the system will be discussed hereinafter. The output 29 of photodetector 23 is recorded by recording and analysis modules 31 and processed in a manner to be described.

Subjecting points 16 and 18 of the fiber to bursts of charged particles from beam 12 launches identical Cerenkov light pulses at those points. In one application of a system according to FIG. 1, 50-psec (FWHM), 4-ampere, delta function bursts of 20-Mev, relativistic electrons from a linear accelerator was utilized for that purpose. The electron beam was about 1.0 cm in diameter at the fiber. To achieve maximum light coupling, the fiber axis was oriented at 47° with respect to the beam, essentially the Cerenkov angle for the particular fiber.

Figure 2:
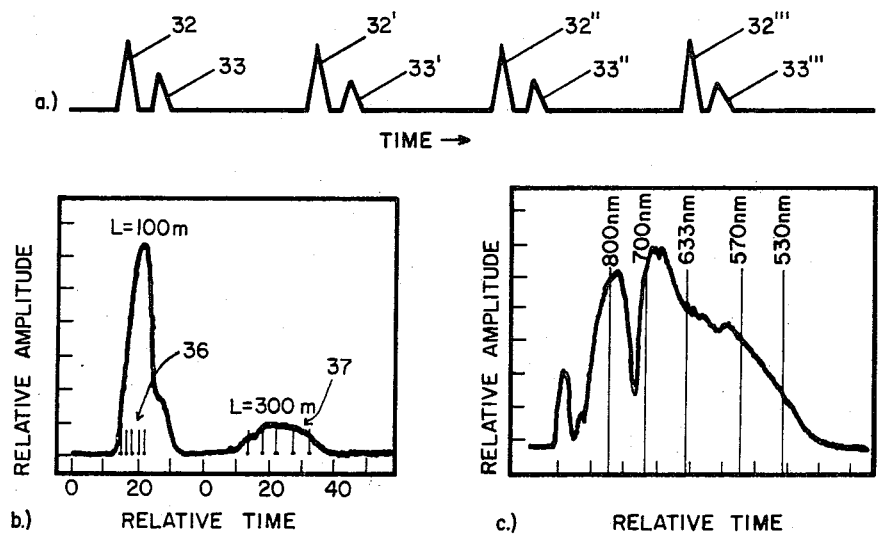

The pair of pulses 32 and 33 on graph (a) of FIG. 2 represents the Cerenkov light pulses launched at points 16 and 18, respectively, by a burst of electrons from beam 12 as the pulses arrive at end 20 of the fiber. The pairs 32' and 33', etc., represent the pulses arriving at end 20 from subsequent electron bursts. The difference in the arrival times (and intensities) of pulses 32 and 33 is due to the combined effects of attenuation and time dispersion in the additional length, $\Delta L$, of the fiber between points 18 and 16 that the pulse launched at 18 was required to travel.

The temporal distribution of unfiltered Cerenkov pulses transmitted through two different lengths of a low-loss optical fiber is shown in FIG. 2b. This figure is a replica of an actual oscilloscope trace for an experiment using two launch points providing the indicated 100 and 300 m lengths of travel. The two groups of five oscilloscope markers, or cursors, 36 and 37 mark the time channels where maximum transmission had been recorded using narrow-band optical filters of 800, 700, 633, 570, and 530 nm, from left to right, for each of the two lengths.

FIG. 2c shows the resolution that is obtainable using this technique. FIG. 2c is a replica of an expanded display of a single pulse from a longer length of fiber, 800 m, than either of the lengths utilized in connection with the display of FIG. 2b.

The particular photodetector 23 utilized in the application previously alluded to was a cooled, cross-field photomultiplier tube (PMT) having a spectrally broad InGaAsP photocathode. The recording and analysis modules 31 included a sampling oscilloscope with a remote sampling head which was closely coupled to the PMT. The PMT and remote sampling head were positioned within the radiation barrier associated with the linear accelerator, whereas the oscilloscope itself and other electronic components making up recording and analysis modules 31 were outside of that barrier. The particular sampling oscilloscope used was a Hewlett Packard Corporation Model 140-A and the electronic components included a Nuclear Data Corporation Model 50/50 Data Acquisition System. The time responses of the oscilloscope and PMT were measured to be 35 psec and 200 psec, respectively.

To obtain the display represented by the graph (a) of FIG. 2, the Cerenkov pulses generated at a given launch point are sampled on successive electron burst until the desired number of sample points is obtained, after which pulses from other launch points are similarly sampled. Pulses from each launch point are thus displayed on every sweep of the 1024-channel sampling oscilloscope. Switching the sampling system to pulses from different launch points is accomplished by a supplementary delay circuit for the sampling oscilloscope trigger which is set for the transit time differentials associated with the various launch points. Successive sweeps are recorded and stored to enhance the signal to noise ratio of the pulse data.

Other sampling modes and switching sequences are possible to persons skilled in the art where different display formats are desired.

During transmission measurements, the accelerator was operated in a repetitive mode at 360 pps. The successive sampling oscilloscope traces of the transmitted pulses were signal-averaged and stored. The relationship between the arrival time of various discrete spectral components of the transmitted pulse through a given fiber length and their average wavelength was determined by remotely inserting calibrated narrow-band filters 27 between end 20 of the fiber and the photocathode of the PMT (photodetector 23), preferably between lens 26 and the PMT. Center wavelengths of the filters used were 1060, 800, 700, 633, 570, and 530 nm; their full width at half maximum transmission points were 60, 11, 11, 5.3, 9.7 and 4.4 nm, respectively.

After signal averaging, the oscilloscope traces from the filtered pulses were stored on a common time base with the unfiltered distribution, in separate memory groups of the Nuclear Data 50/50 Data Acquisition System. When a predetermined number of spectral markers had been recorded, a composite display of filtered and unfiltered data was recalled for analysis. The difference in time between the maxima of the filtered distributions was read directly from this display, and from it the Δt versus Δλ function was obtained and were used to construct an intensity versus wavelength curve. The above procedures were used for pulses transmitted through each of the fiber lengths. From these curves, the attenuation coefficient $\alpha(\lambda)$ was obtained using Equation 2. The time base of the data acquisition system was calibrated in nsec/channel by sampling the 1300-MHz master oscillator frequency of the linear accelerator.

Figure 3:
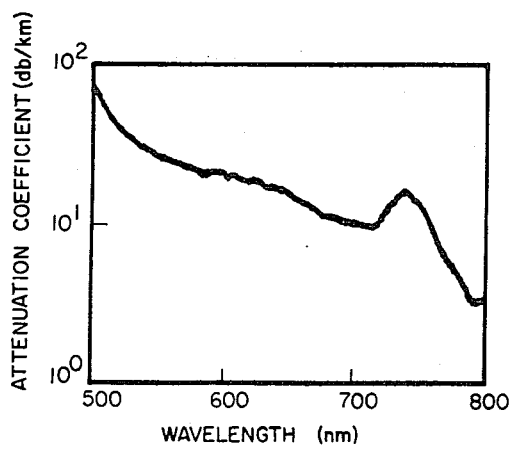
FIG. 3 is a graphical representation of typical unfolding of the attenuation coefficient versus wavelength data utilizing the system of FIG. 1.

FIG. 3 is a graphical representation of the attenuation coefficient vs. wavelength data obtained on a graded index optical fiber from a differential path length of 200 m utilizing the above described system.

While the fundamental novel features of this invention have been shown and described and pointed out as applied to particular embodiments by way of example, it will be appreciated by those skilled in the art that various omissions, substitutions, and changes may be made within the principle and scope of the invention as expressed in the appended claims.

What we claim is:

1. A method for nondestructively determining the attenuation coefficient $\alpha(\lambda)$ of a length of fiber optic wave guide comprising:

a. Launching identical light pulses at essentially the same time at a plurality of locations along said wave guide for transmission toward one end thereof, b. Detecting the time of arrival and intensity of said light pulses at selected wavelengths of said pulses at said one end, and c. Utilizing said time of arrival and intensity information to unfold the $\alpha(\lambda)$.

2. The method of claim 1 wherein said light pulses are Cerenkov light generated by subjecting said fiber to a beam of charged particles.

3. The method of claim 2 wherein said beam intersects the fiber at said plurality of locations at the Cerenkov angle for said fiber plus or minus the acceptance angle for said fiber.

4. The method of claim 2 wherein said charged particles are relativistic electrons.

5. The method of claim 1 wherein the unfolding of $\alpha(\lambda)$ is effected through utilization of the relationship.

$$\alpha(\lambda) = \frac{10}{\Delta L} \log_{10} \frac{I_1(\lambda)}{I_2(\lambda)}$$

where $I_1(\lambda)$ is the intensity at the wavelength $\lambda$ of the pulse transmitted through the shorter of two fiber lengths, $L_1$, and $I_2(\lambda)$ is the intensity at that wavelength of the pulse transmitted through the longer of said two fiber lengths, $L_2$, and $\Delta L$ is equal to $L_2 - L_1$.

6. The method of claim 5 wherein said light pulses are Cerenkov light generated by subjecting said fiber to a beam of charged particles.

7. The method of claim 6 wherein said beam intersects the fiber at said plurality of locations at the Cerenkov angle for said fiber plus or minus the acceptance angle for said fiber.

* * * * *